US012755892B2

(12) United States Patent
Furukawa et al.

(10) Patent No.: US 12,755,892 B2
(45) Date of Patent: Oct. 6, 2026

(54) COIL COMPONENT

(71) Applicant: Murata Manufacturing Co., Ltd., Kyoto-fu (JP)

(72) Inventors: Shoichiro Furukawa, Nagaokakyo (JP); Takashi Tomohiro, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 820 days.

(21) Appl. No.: 18/186,755

(22) Filed: Mar. 20, 2023

(65) Prior Publication Data

US 2023/0317359 A1 Oct. 5, 2023

(30) Foreign Application Priority Data

Mar. 30, 2022 (JP) ................................ 2022-057175

(51) Int. Cl.
*H01F 27/29* (2006.01)

(52) U.S. Cl.
CPC .................................. *H01F 27/292* (2013.01)

(58) Field of Classification Search
CPC ..................................................... H01F 27/292
See application file for complete search history.

(56) References Cited

U.S. PATENT DOCUMENTS

2012/0306607 A1* 12/2012 Jeong .................. H01F 17/0013 336/192
2013/0257576 A1* 10/2013 Arata .................. H01F 17/0013 336/200
2017/0338031 A1* 11/2017 Miyahara ............ H01F 17/0006
2018/0277296 A1* 9/2018 Endo ...................... H01F 41/046
2019/0214182 A1* 7/2019 Imada ................... H01F 41/043
2020/0111603 A1* 4/2020 Sato ....................... H01F 27/292
2020/0111608 A1* 4/2020 Sato ......................... C04B 35/26
2022/0319763 A1* 10/2022 Tobita ....................... H01F 5/04

FOREIGN PATENT DOCUMENTS

CN 111009400 A 4/2020
JP 4479353 B2 6/2010
JP 2013-211302 A 10/2013
JP 2014138168 A * 7/2014
JP 2016-111280 A 6/2016
JP 2021-057482 A 4/2021

* cited by examiner

*Primary Examiner* — Malcolm Barnes
(74) *Attorney, Agent, or Firm* — Studebaker Brackett PLLC

(57) ABSTRACT

A coil component including an element assembly containing a magnetic material, a coil conductor embedded in the element assembly, a connection conductor disposed in the element assembly, an extended conductor for coupling the coil conductor to the connection conductor, and an outer electrode disposed on a bottom surface of the element assembly. The coil conductor is electrically coupled to the outer electrode with the connection conductor and the extended conductor interposed therebetween. The connection conductor extends from a junction portion connected to the extended conductor in a first direction, and a width of the connection conductor is larger than a width of the coil conductor when viewed in the first direction.

20 Claims, 9 Drawing Sheets

COIL COMPONENT

CROSS-REFERENCE TO RELATED APPLICATION

This application claims benefit of priority to Japanese Patent Application No. 2022-057175, filed Mar. 30, 2022, the entire content of which is incorporated herein by reference.

BACKGROUND

Technical Field

The present disclosure relates to a coil component.

Background Art

A substantially rectangular parallelepiped coil component including a coil inside a magnetic substance and having an electrode on a bottom surface is a known coil component, as described, for example, in Japanese Unexamined Patent Application Publication No. 2021-57482.

In the coil component described in Japanese Unexamined Patent Application Publication No. 2021-57482, as illustrated in FIG. 5 of Japanese Unexamined Patent Application Publication No. 2021-57482, since a coil is linearly connected to an outer electrode with a via conductor interposed therebetween, the position at which the outer electrode is formed has to be a region including a corner portion of an element assembly, and the degree of design flexibility is reduced.

SUMMARY

Accordingly, the present disclosure provides a coil component having a high degree of setting flexibility of an outer electrode and being capable of suppressing direct-current resistance from increasing.

The present disclosure includes the following aspects.

(1) A coil component including an element assembly containing a magnetic material, a coil conductor embedded in the element assembly, a connection conductor disposed in the element assembly, an extended conductor for coupling the coil conductor to the connection conductor, and an outer electrode disposed on a bottom surface of the element assembly. The coil conductor is electrically coupled to the outer electrode with the connection conductor and the extended conductor interposed therebetween. Also, the connection conductor extends from a junction portion connected to the extended conductor in a first direction, and a width of the connection conductor is larger than a width of the coil conductor when viewed in the first direction.

(2) The coil component according to (1) above, wherein the coil component has a substantially rectangular parallelepiped shape where a height direction is an axial direction of the coil conductor, a length direction is a long-side direction of a bottom surface, and a width direction is a short-side direction of the bottom surface, and the first direction is the width direction.

(3) The coil component according to (1) or (2) above, wherein the width of the connection conductor is twice or more and 4 times or less (i.e., from twice to 4 times) the width of the coil conductor.

(4) The coil component according to any one of (1) to (3) above, wherein a second extended conductor is disposed between the connection conductor and the outer electrode.

(5) The coil component according to any one of (1) to (4) above, wherein the outer electrode is a plating layer.

(6) The coil component according to any one of (1) to (4) above, wherein the outer electrode is an underlying electrode and a plating layer disposed on the underlying electrode.

(7) The coil component according to (5) or (6) above, wherein the plating layer is a Cu layer, a Ni—Sn layer, a Ni—Au layer, a Ni—Cu layer, or a Cu—Ni—Au layer.

(8) A coil array including a plurality of coil components according to any one of (1) to (7) above.

According to the present disclosure, a connection conductor extending from the junction portion connected to an extended conductor in a first direction and the width of the connection conductor viewed in the first direction being larger than the width of a coil conductor enable a coil component having a high degree of setting flexibility of the outer electrode and being capable of suppressing the direct-current resistance from increasing to be provided.

DETAILED DESCRIPTION

Figure 1:
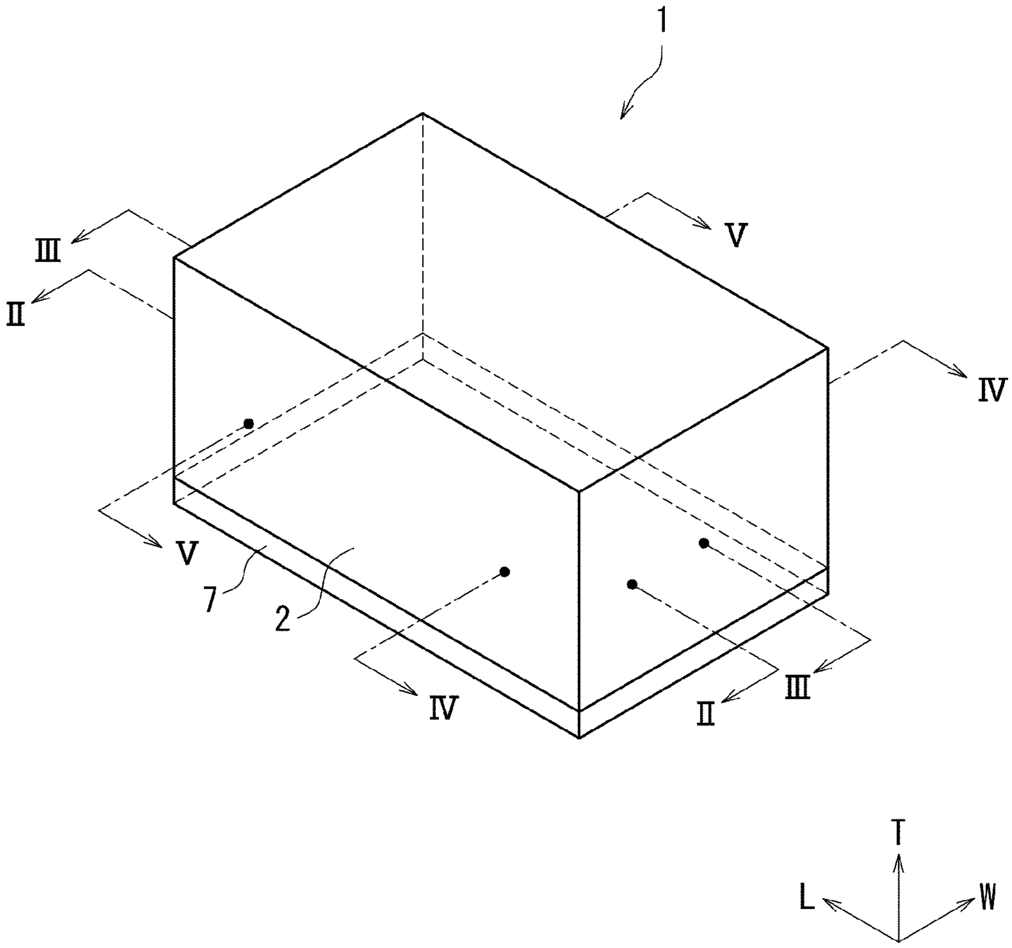
FIG. 1 is a schematic perspective view illustrating a multilayer coil component 1 according to a first embodiment of the present disclosure.

A coil component according to the present disclosure will be described below in detail with reference to the drawings.

However, the coil component according to the present disclosure and the shapes, the arrangements, and the like of constituent elements are not limited to the examples illustrated. In the drawings, members having the same function may be indicated by the same reference. In consideration of ease of explanations or understanding of important points, some embodiments will be described for the sake of convenience. However, configurations described in different embodiments can be partly replaced or combined with each other. Regarding an embodiment described after another embodiment, explanations of matters common to the former embodiment may be omitted, and only different points may be explained. In particular, the same operation and advantage due to the same configuration are not limited to be described one by one on an embodiment basis. The size, the positional relationship, and the like of members illustrated in the drawings may be exaggerated to clarify the explanations.

First Embodiment

Figure 2:
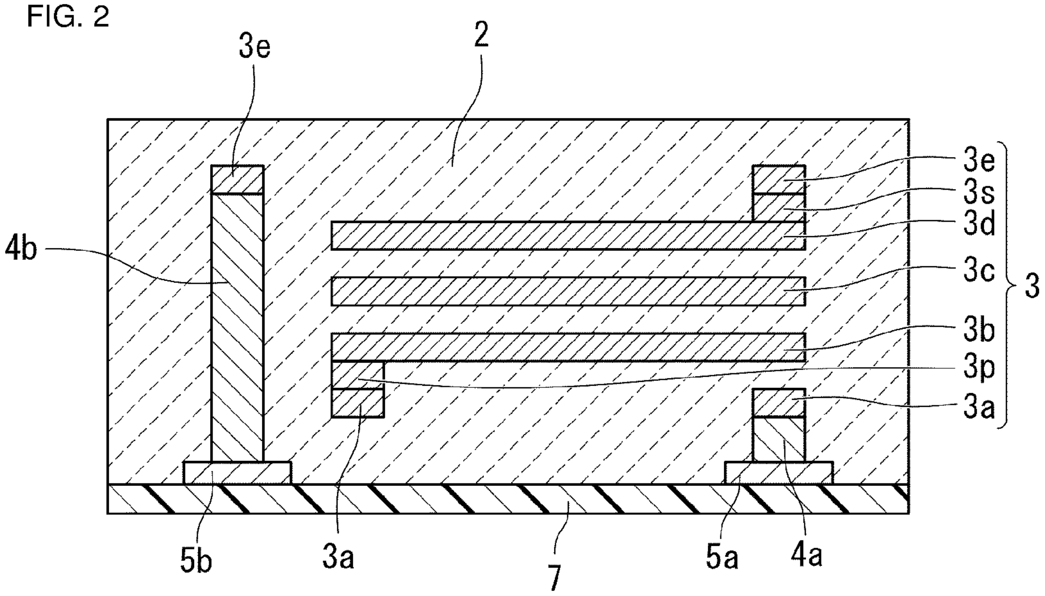
FIG. 2 is a schematic sectional view illustrating a cross section of the multilayer coil component 1 cut along line II-II in FIG. 1.
Figure 3:
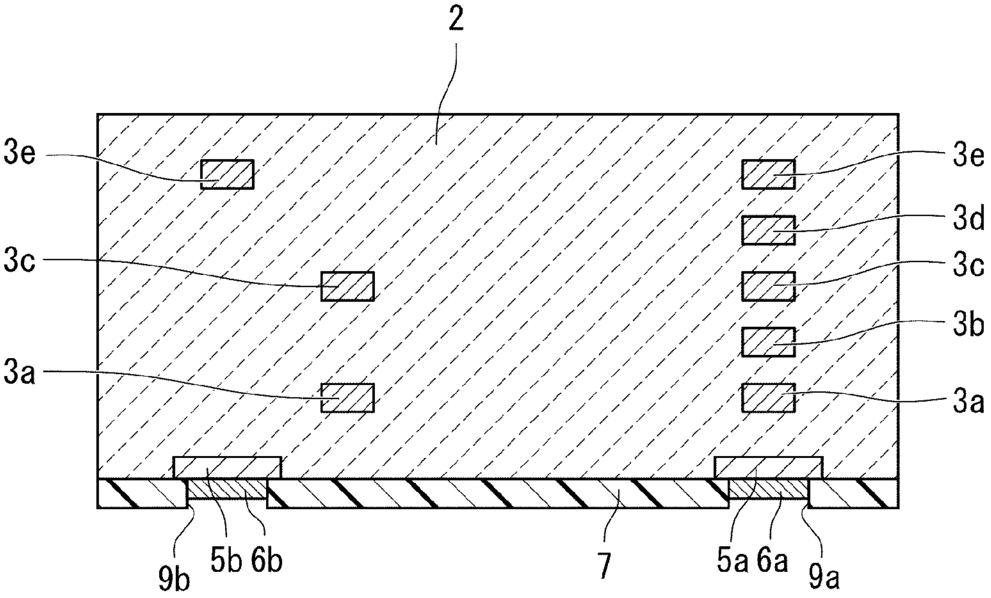
FIG. 3 is a schematic sectional view illustrating a cross section of the multilayer coil component 1 cut along line III-III in FIG. 1.
Figure 4:
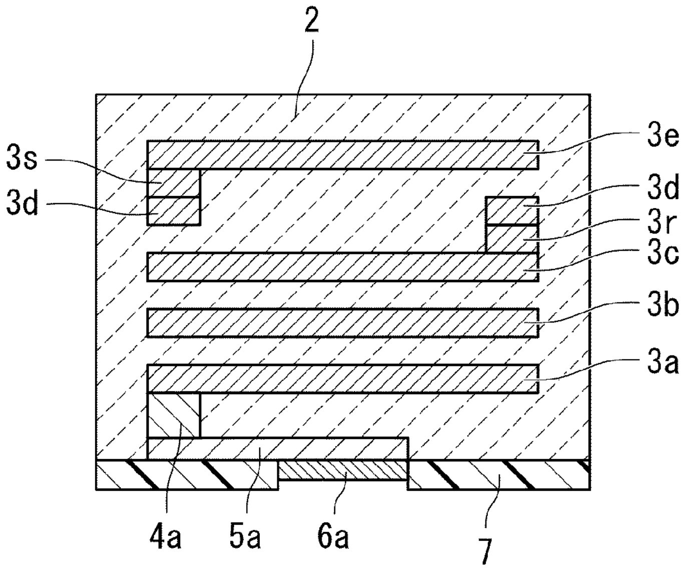
FIG. 4 is a schematic sectional view illustrating a cross section of the multilayer coil component 1 cut along line IV-IV in FIG. 1.
Figure 5:
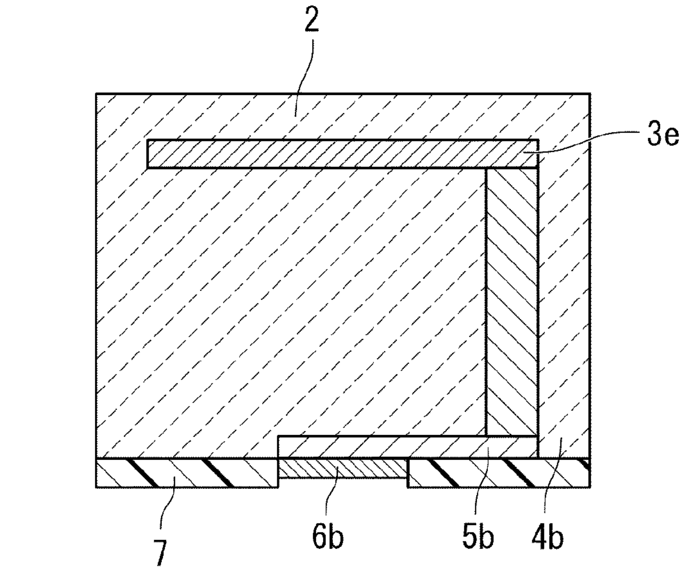
FIG. 5 is a schematic sectional view illustrating a cross section of the multilayer coil component 1 cut along line V-V in FIG. 1.
Figure 6:
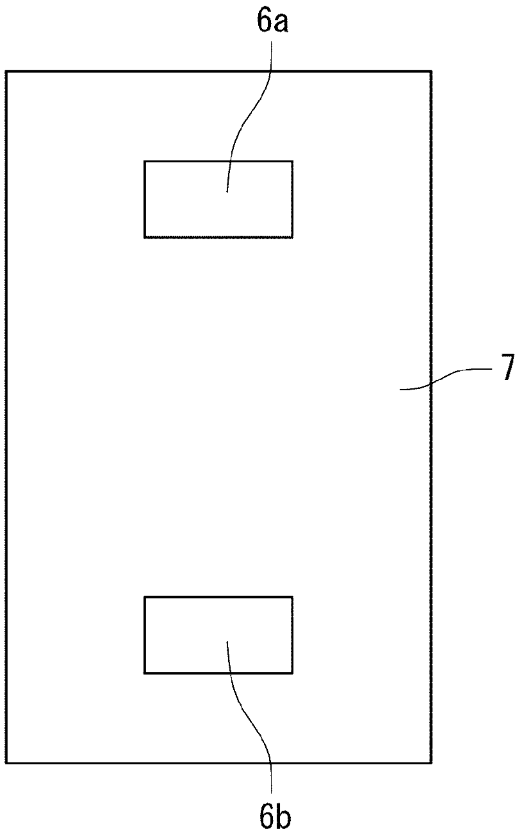
FIG. 6 is a schematic bottom view of the multilayer coil component 1 in FIG. 1.

FIG. 1 is a perspective view illustrating a multilayer coil component 1 according to the present embodiment, and FIG. 6 is a bottom view. In addition, FIG. 2 is a schematic sectional view of the multilayer coil component 1 cut along line II-II, FIG. 3 is a schematic sectional view cut along line III-III, FIG. 4 is a schematic sectional view cut along line IV-IV, and FIG. 5 is a schematic sectional view cut along line V-V.

As illustrated in FIG. 1 to FIG. 6, the multilayer coil component 1 according to the present embodiment has a substantially rectangular parallelepiped shape. In this regard, in FIG. 1, a lower surface is denoted as a bottom surface, an upper surface is denoted as a top surface, and other surfaces are denote as side surfaces. The multilayer coil component 1 roughly includes an element assembly 2, a coil conductor 3 embedded in the element assembly 2, outer electrodes 6*a* and 6*b*, and an insulating layer 7 for covering a bottom surface of the element assembly 2. The coil conductor 3 is electrically coupled to the outer electrodes 6*a* and 6*b* with extended conductors 4*a* and 4*b* and connection conductors 5*a* and 5*b* interposed therebetween. The insulating layer 7 has cavities 9*a* and 9*b*. The outer electrodes 6*a* and 6*b* are present in the cavities 9*a* and 9*b*. The coil conductor 3 is formed from a plurality of inner electrode layers 3*a* to 3*e* being connected to each other with via conductors 3*p* to 3*s* interposed therebetween. The outer electrodes 6*a* and 6*b* are disposed on the connection conductors 5*a* and 5*b* located inside the element assembly 2 and are located in the cavities 9*a* and 9*b*. The outer electrodes 6*a* and 6*b* are electrically coupled to both ends of the coil conductor 3 with the connection conductors 5*a* and 5*b* and the extended conductors 4*a* and 4*b* interposed therebetween.

The coil component according to the present disclosure preferably has a length (L) of 1.0 mm or more and 6.0 mm or less (i.e., from 1.0 mm to 6.0 mm), a width (W) of 0.2 mm or more and 2.0 mm or less (i.e., from 0.2 mm to 2.0 mm), and a height (T) of 0.2 mm or more and 2.0 mm or less (i.e., from 0.2 mm to 2.0 mm) and more preferably has a length of 1.0 mm or more and 2.0 mm or less (i.e., from 1.0 mm to 2.0 mm), a width of 0.5 mm or more and 1.2 mm or less (i.e., from 0.5 mm to 1.2 mm), and a height of 0.5 mm or more and 1.2 mm or less (i.e., from 0.5 mm to 1.2 mm).

In the present embodiment, the element assembly 2 includes a magnetic layer containing a magnetic material.

The magnetic material is typically a metal magnetic particle.

There is no particular limitation regarding a metal magnetic material constituting the metal magnetic particle provided that the material has magnetism, and examples include iron, cobalt, nickel, and gadolinium and alloys containing at least one of these metals. It is preferable that the metal magnetic material be iron or an iron alloy. The iron may be just iron or be an iron derivative, for example, a complex. There is no particular limitation regarding the iron derivative, and examples include iron carbonyls, which are complexes of iron and CO, and preferably include iron pentacarbonyl. In particular, a hard-grade iron carbonyl (for example, a hard-grade iron carbonyl produced by BASF) having an onion skin structure (structure in which concentric-sphere-shaped layers are formed around the center of a particle) is preferable. There is no particular limitation regarding the iron alloy, and examples include Fe—Si-based alloys, Fe—Si—Cr-based alloys, and Fe—Si—Al-based alloys.

In a preferred aspect, the metal magnetic material is an Fe—Si-based alloy or an Fe—Si—Cr-based alloy. When an Fe—Si-based alloy is used as the metal magnetic powder, the Si content is preferably 2.0 at % or more and 8.0 at % or less (i.e., from 2.0 at % to 8.0 at %). When an Fe—Si—Cr-based alloy is used, the Si content is preferably 2.0 at % or more and 8.0 at % or less (i.e., from 2.0 at % to 8.0 at %), and the Cr content is preferably 0.2 at % or more and 6.0 at % or less (i.e., from 0.2 at % to 6.0 at %).

The above-described alloy may further contain B, C, and the like as other secondary components. There is no particular limitation regarding the content of the secondary component. For example, the content may be 0.1% by mass or more and 5.0% by mass or less (i.e., from 0.1% by mass to 5.0% by mass) and preferably 0.5% by mass or more and 3.0% by mass or less (i.e., from 0.5% by mass to 3.0% by mass). The metal magnetic material may be only one type or two or more types.

The metal magnetic particle may contain impurity components such as Cr, Mn, Cu, Ni, P, and S. These impurity components are unintentionally included, and the content thereof may be, for example, 1% by mass or less and preferably 0.1% by mass or less.

The metal magnetic particle has an average particle diameter of preferably 0.5 μm or more and 50 μm or less (i.e., from 0.5 μm to 50 μm), more preferably 1 μm or more and 30 μm or less (i.e., from 1 μm to 30 μm), and further preferably 2 μm or more and 20 μm or less (i.e., from 2 μm to 20 μm). Setting the average particle diameter of the metal magnetic particle to be 0.5 μm or more facilitates handling of the metal magnetic particle. In addition, setting the average particle diameter of the metal magnetic particle to be 50 μm or less enables the filling ratio of the metal magnetic particle to be increased so that the magnetic characteristics of the magnetic layer are improved.

In this regard, the average particle diameter denotes an average of the equivalent circle diameters of metal magnetic particles in an SEM (scanning electron microscope) image of a cross section of the magnetic layer. For example, the average particle diameter can be obtained by taking SEM images of a plurality of (for example, five) regions (for example, 130 μm×100 μm) in a cross section obtained by cutting the multilayer coil component 1, analyzing the resulting SEM images by using image analysis software (for example, Azokun (registered trademark) produced by Asahi Kasei Engineering Corporation) so as to determine the equivalent circle diameters of 500 or more metal particles, and calculating the average thereof.

The metal magnetic particle has preferably an oxide film.

The oxide film may be an oxide film of a metal constituting the metal magnetic particle.

There is no particular limitation regarding the thickness of the oxide film. The thickness is preferably 1 nm or more and 100 nm or less (i.e., from 1 nm to 100 nm), more preferably 3 nm or more and 50 nm or less (i.e., from 3 nm to 50 nm), and further preferably 5 nm or more and 30 nm or less (i.e., from 5 nm to 30 nm) and, for example, may be 10 nm or more and 30 nm or less (i.e., from 10 nm to 30 nm) or may be 5 nm or more and 20 nm or less (i.e., from 5 nm to 20 nm). Increasing the thickness of the oxide film improves the specific resistance of the magnetic layer. In addition, decreasing the thickness of the oxide film enables the amount of the metal magnetic particle in the magnetic layer to be increased, improves the magnetic characteristics of the magnetic layer, and facilitates a size reduction of the magnetic layer.

The metal magnetic particles are bonded by the oxide film.

The metal magnetic particle may be insulation-coated with an insulating film. The insulating film may be a film other than the above-described oxide film.

The insulating film is preferably a film containing an metal oxide and more preferably a Si oxide film.

Examples of the method for forming the insulating film include a mechanochemical method and a sol-gel method. In particular, when a Si oxide film is formed, the sol-gel method is preferably used. When a film containing the Si oxide is formed by using the sol-gel method, the film can be formed by mixing a sol-gel coating agent containing Si alkoxide and an organic-chain-containing silane coupling agent, attaching the resulting liquid mixture to the surface of the metal magnetic particle, performing heating treatment so as to cause dehydration bonding, and performing drying at a predetermined temperature.

The insulating film may cover only a portion of the surface of the metal magnetic particle or may cover the entire surface. In this regard, there is no particular limitation regarding the shape of the insulating film, and the shape may be a mesh or a layer. In a preferred aspect, a region covered by the insulating film is 50% or more, preferably 70% or more, more preferably 80% or more, further preferably 90% or more, and particularly preferably 100% the surface of the metal magnetic particle. The surface of the metal particle being covered with the insulating film enables the specific resistance of the interior of the magnetic layer to be increased.

There is no particular limitation regarding the thickness of the insulating film. The thickness is preferably 1 nm or more and 100 nm or less (i.e., from 1 nm to 100 nm), more preferably 3 nm or more and 50 nm or less (i.e., from 3 nm to 50 nm), and further preferably 5 nm or more and 30 nm or less (i.e., from 5 nm to 30 nm) and, for example, may be 10 nm or more and 30 nm or less (i.e., from 10 nm to 30 nm) or may be 5 nm or more and 20 nm or less (i.e., from 5 nm to 20 nm). Increasing the thickness of the insulating film enables the specific resistance of the interior of the magnetic layer to be increased. In addition, decreasing the thickness of the insulating film enables the amount of the metal magnetic particle in the magnetic layer to be increased, improves the magnetic characteristics of the magnetic layer, and facilitates a size reduction of the magnetic layer.

The element assembly 2 may include a nonmagnetic layer in addition to the magnetic layer.

The nonmagnetic layer is disposed preferably between inner electrode layers.

The nonmagnetic layer being disposed improves the direct-current superimposition characteristics of the multilayer coil component and improves the insulation performance between the inner electrodes.

The nonmagnetic layer is preferably composed of a sintered nonmagnetic material containing at least Fe, Cu, and Zn as primary components.

In the sintered nonmagnetic material, the Fe content may be preferably 40.0% by mol or more and 49.5% by mol or less (i.e., from 40.0% by mol to 49.5% by mol) (relative to the total amount of the primary components, the same applies hereafter) and more preferably 45.0% by mol or more and 49.5% by mol or less (i.e., from 45.0% by mol to 49.5% by mol) in terms of $Fe_2O_3$.

In the sintered nonmagnetic material, the Cu content is preferably 4.0% by mol or more and 12.0% by mol or less (i.e., from 4.0% by mol to 12.0% by mol) (relative to the total amount of the primary components, the same applies hereafter) and more preferably 6.0% by mol or more and 10.0% by mol or less (i.e., from 6.0% by mol to 10.0% by mol) in terms of CuO.

In the sintered nonmagnetic material, there is no particular limitation regarding the Zn content, and the content may be the result of subtracting the content of Fe and Cu which are other primary components from the content of the primary components and may be preferably 39.5% by mol or more and 56.0% by mol or less (i.e., from 39.5% by mol to 56.0% by mol) (relative to the total amount of the primary components, the same applies hereafter) and more preferably 40.5% by mol or more and 49.0% by mol or less (i.e., from 40.5% by mol to 49.0% by mol) in terms of ZnO.

Setting the contents of Fe, Cu, and Zn to be within the above-described ranges enables excellent electric characteristics to be obtained.

In the present disclosure, the sintered nonmagnetic material may further contain an additive component. Examples of the additive component in the sintered nonmagnetic material include Mn, Co, Sn, Bi, and Si and are not limited to these. The content (amount of addition) of each of Mn, Co, Sn, Bi, and Si relative to 100 parts by mass of the total primary components (Fe (in terms of $Fe_2O_3$), Zn (in terms of ZnO), Cu (in terms of CuO), and Ni (in terms of NiO)) is preferably 0.1 parts by mass or more and 1 part by mass or less (i.e., from 0.1 parts by mass to 1 part by mass) in terms of $Mn_3O_4$, $Co_3O_4$, $SnO_2$, $Bi_2O_3$, and $SiO_2$, respectively. In this regard, the sintered nonmagnetic material may further contain impurities incidental to the production.

The thickness of the nonmagnetic layer may be preferably 5 μm or more and 180 μm or less (i.e., from 5 μm to 180 μm), more preferably 10 μm or more and 100 μm or less (i.e., from 10 μm to 100 μm), and further preferably 30 μm or more and 100 μm or less (i.e., from 30 μm to 100 μm).

The coil conductor 3 is formed from a plurality of inner electrode layers 3*a* to 3*e* being connected to each other with via conductors 3*p* to 3*s* interposed therebetween.

There is no particular limitation regarding the thickness of the inner electrode layer, and the thickness is preferably 15 μm or more and 150 μm or less (i.e., from 15 μm to 150 μm) and more preferably 20 μm or more and 40 μm or less (i.e., from 20 μm to 40 μm).

There is no particular limitation regarding the width of the coil conductor, that is, the width of the inner electrode layer, and the width is preferably 50 μm or more and 250 μm or less (i.e., from 50 μm to 250 μm) and more preferably 100 μm or more and 200 μm or less (i.e., from 100 μm to 200

μm). In this regard, the width of the coil conductor denotes a length of the major axis in a cross section orthogonal to the flow direction of a current.

The inner electrode layer contains an electrically conductive material. The electrically conductive material includes silver, copper, or gold or an alloy thereof. The inner electrode layer preferably contains silver as the electrically conductive material and more preferably contains just silver.

The extended conductors 4*a* and 4*b* electrically couple the ends of the coil conductor 3 to the connection conductors 5*a* and 5*b*. In the present embodiment, the extended conductor 4*a* couples the inner electrode layer 3*a* at the coil lower end to the connection conductor 5*a*, and the extended conductor 4*b* couples the inner electrode layer 3*e* at the coil upper end to the connection conductor 5*b*. The extended conductor 4*b* is longer than the extended conductor 4*a*.

The extended conductors 4*a* and 4*b* preferably contain the electrically conductive material akin to that of the inner electrode layer. The electrically conductive material includes silver, copper, or gold or an alloy thereof. The extended conductors 4*a* and 4*b* preferably contain silver as the electrically conductive material and more preferably contain just silver.

There is no particular limitation regarding the width of the extended conductor, and the width is preferably 50 μm or more and 250 μm or less (i.e., from 50 μm to 250 μm) and more preferably 100 μm or more and 200 μm or less (i.e., from 100 μm to 200 μm). In this regard, in the cross section orthogonal to the flow direction of a current, the width of the extended conductor denotes a length of the longest straight line of straight lines crossing the cross section.

The insulating layer 7 is disposed on the bottom surface of the element assembly 2.

In the multilayer coil component 1, the insulating layer 7 is disposed on only the bottom surface. In other words, the insulating layer 7 is not present on the top surface nor the side surfaces of the element assembly 2. In this regard, the coil component according to the present disclosure is not limited to such an aspect. For example, the insulating layer may also be disposed on the side surfaces or side surfaces and the top surface in addition to the bottom surface.

The insulating layer 7 has cavities 9*a* and 9*b*.

The cavities 9*a* and 9*b* are formed so as to expose the connection conductors 5*a* and 5*b*. At the cavity, preferably, only the connection conductor is exposed, and the element assembly 2 is not exposed. In other words, in plan view of the element assembly 2 when viewed from the bottom surface side, the area of the cavities 9*a* and 9*b* is less than or equal to the area of the connection conductors 5*a* and 5*b*, and the cavities 9*a* and 9*b* are located inside the connection conductors 5*a* and 5*b*. The cavity being formed so as not to expose the element assembly 2 enables extension of plating due to contact of a plating liquid with the element assembly 2 to be suppressed from occurring during a plating step of forming a plating layer.

The insulating layer 7 is composed of a resin material having larger insulation resistance than the material for forming the element assembly 2.

Examples of the resin material include resin materials having high electrical insulation performance, such as acrylic resins, epoxy-based resins, and polyamides.

The connection conductors 5*a* and 5*b* extend from junction portions connected to the extended conductors 4*a* and 4*b* in first directions. In the multilayer coil component 1, the connection conductors 5*a* and 5*b* extend from the extended conductors 4*a* and 4*b* in the width direction (W-direction) of the element assembly 2 on the bottom surface of the element assembly 2. The connection conductors 5*a* and 5*b* extending from junction portions connected to the extended conductors 4*a* and 4*b* in first directions increase the degree of setting flexibility of the outer electrode.

In the multilayer coil component 1, the connection conductors 5*a* and 5*b* are embedded in the element assembly 2 while a main surface is exposed at the element assembly 2. In this regard, the coil component according to the present disclosure is not limited to such an aspect. For example, the connection conductor may be completely embedded in the element assembly, or only a portion may be embedded under the bottom surface of the element assembly.

The widths of the connection conductors 5*a* and 5*b* are larger than the width of the coil conductor 3. The widths of the connection conductors 5*a* and 5*b* are preferably twice or more and 4 times or less (i.e., from twice to 4 times) and more preferably 2.5 times or more and 3.5 times or less (i.e., from 2.5 times to 3.5 times) the width of the coil conductor 3. Setting the widths of the connection conductors 5*a* and 5*b* to be larger than the width of the coil conductor 3 enables the direct-current resistance to be reduced. In addition, setting the widths of the connection conductors 5*a* and 5*b* to be 4 times or less the width of the coil conductor 3 enables the distance between the connection conductors to be sufficiently ensured so as to improve the reliability.

There is no particular limitation regarding the width of the connection conductor, and the width is preferably 100 μm or more and 600 μm or less (i.e., from 100 μm to 600 μm) and more preferably 200 μm or more and 500 μm or less (i.e., from 200 μm to 500 μm). In this regard, the width of the connection conductor denotes a length of the major axis in the cross section orthogonal to the flow direction of a current.

The connection conductors 5*a* and 5*b* preferably contain the electrically conductive material akin to that of the inner electrode layer. The electrically conductive material includes silver, copper, or gold or an alloy thereof. The connection conductor preferably contains silver as the electrically conductive material and more preferably contains just silver.

The outer electrodes 6*a* and 6*b* are disposed on the connection conductors 5*a* and 5*b* in the cavities 9*a* and 9*b*. The outer electrode is preferably disposed in the entire cavity in plan view of the element assembly 2 when viewed from the bottom surface side.

The outer electrodes 6*a* and 6*b* may be composed of a single layer or a plurality of layers.

The outer electrodes 6*a* and 6*b* are preferably plating layers.

The outer electrodes 6*a* and 6*b* may include preferably a plating layer containing Cu, a plating layer containing Ni, a plating layer containing Sn, or a plating layer containing Au.

In an aspect, the plating layer may be a Cu plating layer, a Ni—Sn plating layer, a Ni—Au plating layer, a Ni—Cu plating layer, or a Cu—Ni—Au plating layer on the connection conductor.

Next, a method for manufacturing the multilayer coil component 1 according to the present disclosure will be described.

The multilayer coil component 1 according to the present disclosure can be obtained by stacking a magnetic paste, a nonmagnetic paste, and an inner conductor paste and heat-treating the resulting material.

Specifically, the multilayer coil component 1 can be produced as described below.

Regarding the magnetic paste, a magnetic paste including a metal magnetic particle is prepared. The magnetic paste is obtained by mixing and kneading the metal magnetic particle with a mixture of cellulose, polyvinyl butyral, or the like serving as a binder and terpineol, butyl diglycol acetate, or the like serving as a solvent.

Regarding the nonmagnetic paste, a nonmagnetic paste containing a ferrite material is prepared. $Fe_2O_3$, ZnO, and CuO serving as ferrite materials and an additive component, as the situation demands, are weighed so as to form a predetermined composition, the weighed material and pure water, a dispersing agent, and PSZ media are placed into a ball mill, and mixing and pulverization are performed. The resulting slurry is dried and calcined under the condition of a temperature of 700° C. to 800° C. and 2 to 3 hours. The resulting nonmagnetic ferrite material (calcined powder) is mixed with a predetermined amount of a solvent (a ketone-based solvent or the like), a resin (a polyvinyl acetal or the like), and a plasticizer (an alkyd-based plasticizer or the like), kneaded by using a planetary mixer, and dispersed by using a three-roll mill so as to produce a nonmagnetic ferrite paste.

Regarding the conductor paste, a conductor paste, for example, a silver paste, is prepared. The conductor paste is obtained by mixing a conductor powder with a predetermined amount of a solvent, a resin, a dispersing agent, and the like.

Next, a multilayer body of the above-described pastes is produced.

A substrate (not illustrated in the drawing) in which a thermally peelable sheet and a polyethylene terephthalate (PET) film are stacked on a metal plate is prepared, and the magnetic paste is applied thereto by performing predetermined times of screen printing so as to form a magnetic paste layer 21. The resulting magnetic paste layer 21 serves as an outer layer of a coil component (FIG. 7A).

A conductor paste layer 31 serving as a coil conductor is formed on the magnetic paste layer 21. Further, a magnetic paste layer 22 is formed in a region in which the conductor paste layer 31 is not formed (FIG. 7B).

A nonmagnetic ferrite paste layer 81 is formed in a region other than a region to be connected to a coil conductor applied next and a region to be connected to an extended conductor on the conductor paste layer 31. Subsequently, a magnetic paste layer 23 is formed in regions other than the nonmagnetic ferrite paste layer 81 (FIG. 7C).

Figures 7A, 7B, 7C, 7D, 7E, 7F, 7G, 7H, 7I, 7J:
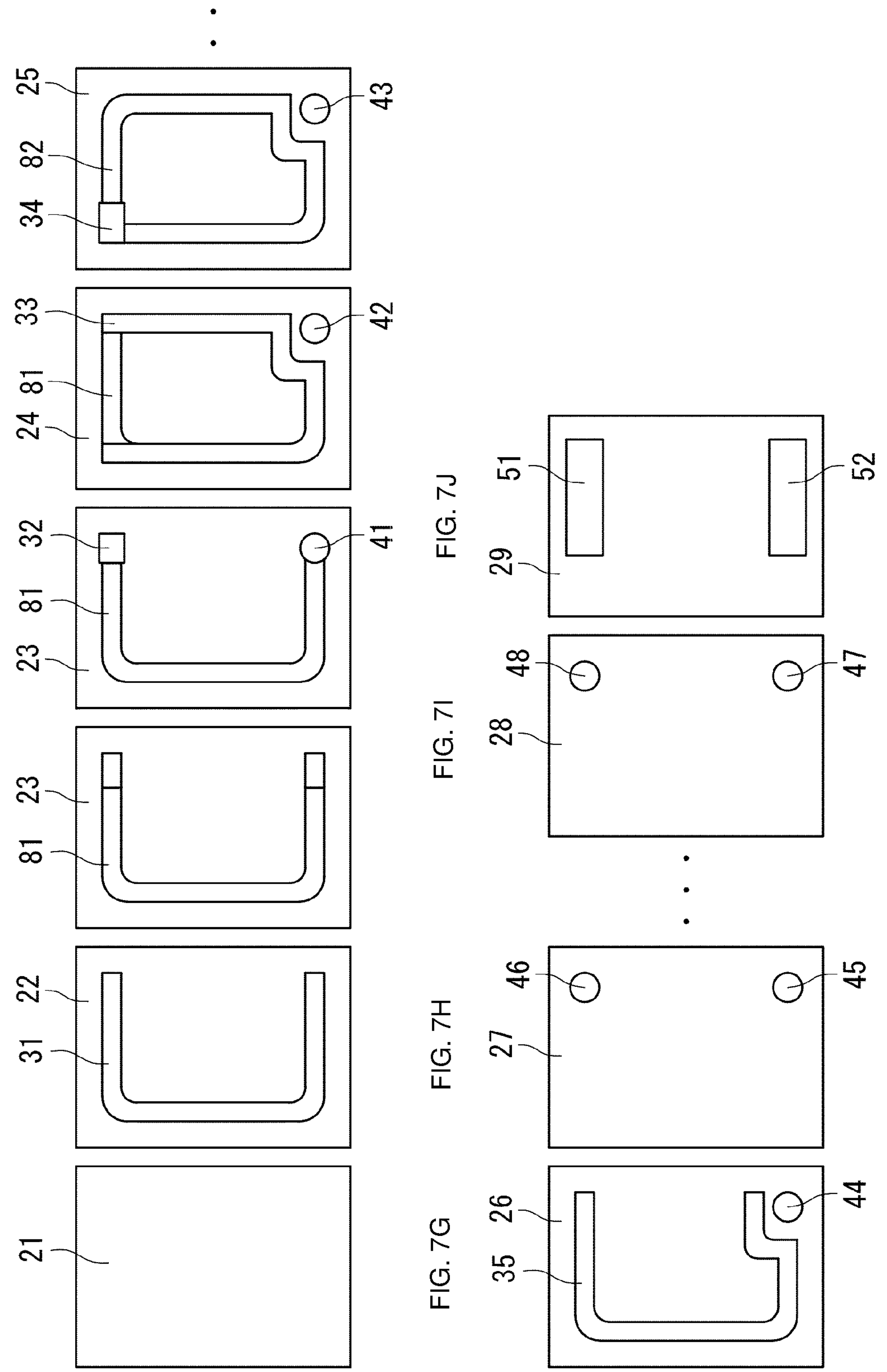
FIGS. 7A to 7J are diagrams illustrating a method for manufacturing the multilayer coil component 1 in FIG. 1.

A conductor paste layer 32 serving as a via conductor (a conductor to be connected to a coil conductor applied next) and a conductor paste layer 41 serving as an extended conductor are formed (FIG. 7D).

A conductor paste layer 33 serving as a coil conductor and a conductor paste layer 42 serving as an extended conductor are formed. Further, a magnetic paste layer 24 is formed in a region in which the conductor paste layers 33 and 42 are not formed (FIG. 7E).

A nonmagnetic ferrite paste layer 82 is formed in a region other than a region to be connected to a coil conductor applied next on the magnetic paste layer 33. In addition, a conductor paste layer 34 serving as a via conductor and a conductor paste layer 43 serving as an extended conductor are formed in regions to be connected to coil conductors applied next. Further, a magnetic paste layer 25 is formed in a region other than these regions (FIG. 7F).

The steps illustrated in FIG. 7E and FIG. 7F above are repeated predetermined times so as to obtain a multilayer body in which a magnetic paste layer 26, a conductor paste layer 35, and a conductor paste layer 44 are formed (FIG. 7G).

Conductor paste layers 45 and 46 are applied to portions serving as extended conductors, and a magnetic paste layer 27 is applied to a portion other than the above-described portions (FIG. 7H). This is repeated predetermined times so as to obtain a multilayer body in which a magnetic paste layer 28 and conductor paste layers 47 and 48 are formed (FIG. 7I).

Conductor paste layers 51 and 52 are formed in regions serving as connection conductors of the outer electrodes, and a magnetic paste layer 29 is formed in a region in which the conductor paste layers 51 and 52 are not formed (FIG. 7J).

Finally, the resulting multilayer body is peeled off the metal plate, the PET film is removed so as to produce a multilayer body block.

The resulting multilayer body block is subjected to pressurization treatment, for example, warm isostatic press (WIP) treatment.

The multilayer body block subjected to the pressurization treatment is degreased, placed into a furnace, and fired.

The firing temperature is preferably 600° C. or higher and 800° C. or lower and more preferably 650° C. or higher and 750° C. or lower.

The firing time is preferably 30 min or more and 90 min or less (i.e., from 30 min to 90 min) and more preferably 40 min or more and 80 min or less (i.e., from 40 min to 80 min).

The firing is performed preferably in the air.

The multilayer body block is impregnated with a resin after firing, and heat curing is performed. An epoxy resin is preferably used as the resin.

Figure 8C:
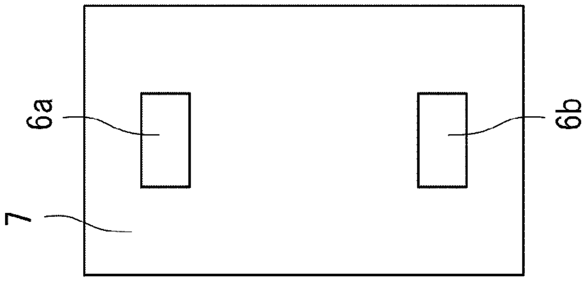
FIGS. 8A to 8C are diagrams illustrating a method for manufacturing the multilayer coil component 1 in FIG. 1.
Figure 8B:
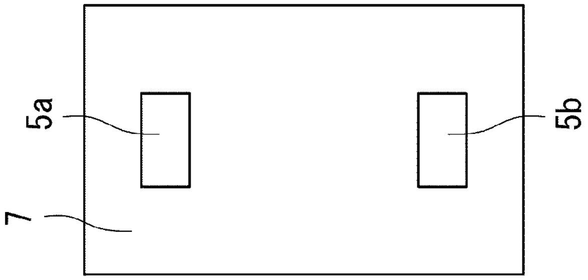
Figure 8A:
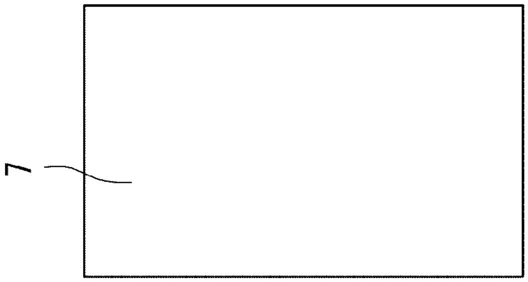

Regarding the multilayer body block subjected to resin impregnation, a photosensitive resist resin is applied by screen printing to the entire surface (lower surface) at which the connection conductor is exposed and dried so as to obtain an insulating layer 7 (FIG. 8A).

After pattern exposure following the shape of the connection conductor is performed, dipping into a developing liquid is performed so as to remove the insulating layer on the connection conductor (FIG. 8B).

Electroless plating is performed so as to form plating layers on the connection conductors (FIG. 8C).

The multilayer body block is cut with a dicer or the like into individual pieces or arrays.

The multilayer coil component 1 can be obtained as described above.

The multilayer coil component according to the present disclosure is described above with reference to the embodiment, but the multilayer coil component according to the present disclosure is not limited to the embodiment above and can be variously modified.

Second Embodiment

Figure 9:
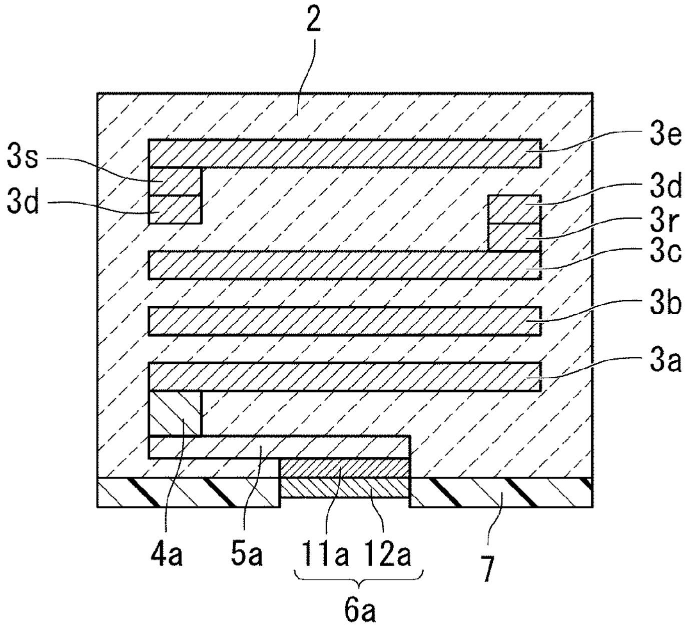
FIG. 9 is a schematic sectional view illustrating a cross section of a multilayer coil component 1 according to a second embodiment cut along line IV-IV.
Figure 10:
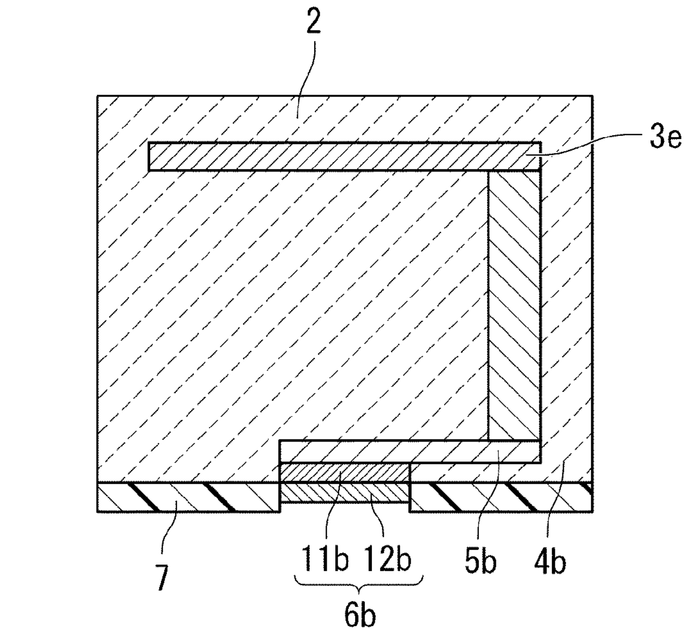
FIG. 10 is a schematic sectional view illustrating a cross section of the multilayer coil component 1 according to the second embodiment cut along line V-V.

As illustrated in FIG. 9 and FIG. 10, a multilayer coil component 1' according to the present second embodiment is akin to the multilayer coil component according to the first embodiment except that the connection conductors 5*a* and 5*b* are completely embedded in the element assembly 2, the outer electrodes 6*a* and 6*b* are formed on the connection conductors 5*a* and 5*b*, and the outer electrodes 6*a* and 6*b* include underlying electrodes 11*a* and 11*b* and plating layers 12*a* and 12*b*.

The underlying electrodes 11*a* and 11*b* preferably contain the electrically conductive material akin to that of the connection conductor. The electrically conductive material includes silver, copper, or gold or an alloy thereof. The underlying electrode preferably contains silver as the electrically conductive material and more preferably contains just silver.

Third Embodiment

Figure 11:
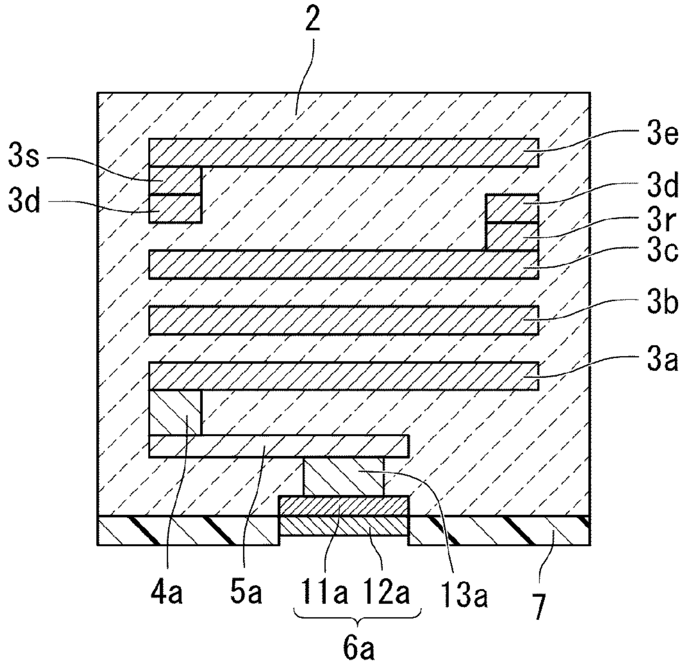
FIG. 11 is a schematic sectional view illustrating a cross section of a multilayer coil component 1 according to a third embodiment cut along line IV-IV.
Figure 12:
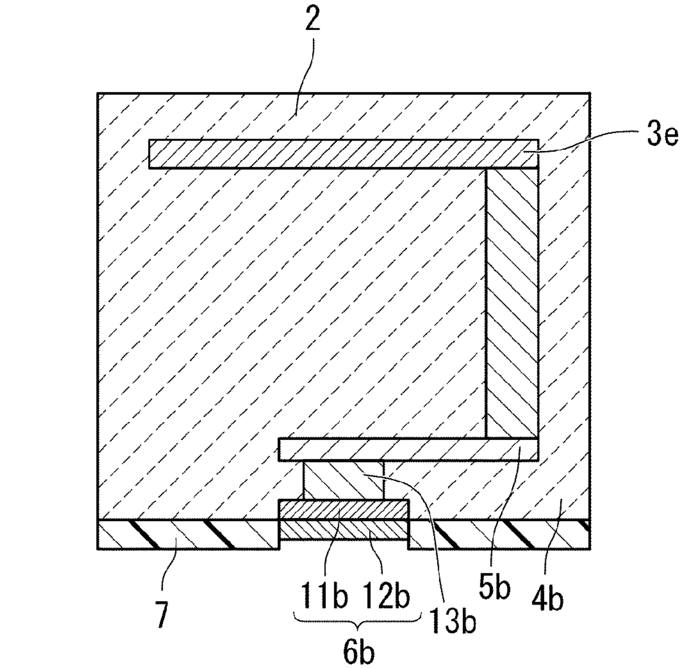
FIG. 12 is a schematic sectional view illustrating a cross section of the multilayer coil component 1 according to the third embodiment cut along line V-V.

As illustrated in FIG. 11 and FIG. 12, a multilayer coil component 1" according to the present third embodiment is akin to the multilayer coil component according to the embodiment 1 except that second extended conductors 13*a* and 13*b* are further included between the connection conductors 5*a* and 5*b* and the outer electrodes 6*a* and 6*b*.

The second extended conductors 13*a* and 13*b* preferably contain the electrically conductive material akin to that of the extended conductors 4*a* and 4*b*. The electrically conductive material includes silver, copper, or gold or an alloy thereof. The second extended conductors 13*a* and 13*b* preferably contain silver as the electrically conductive material and more preferably contain just silver.

Fourth Embodiment

Figure 13:
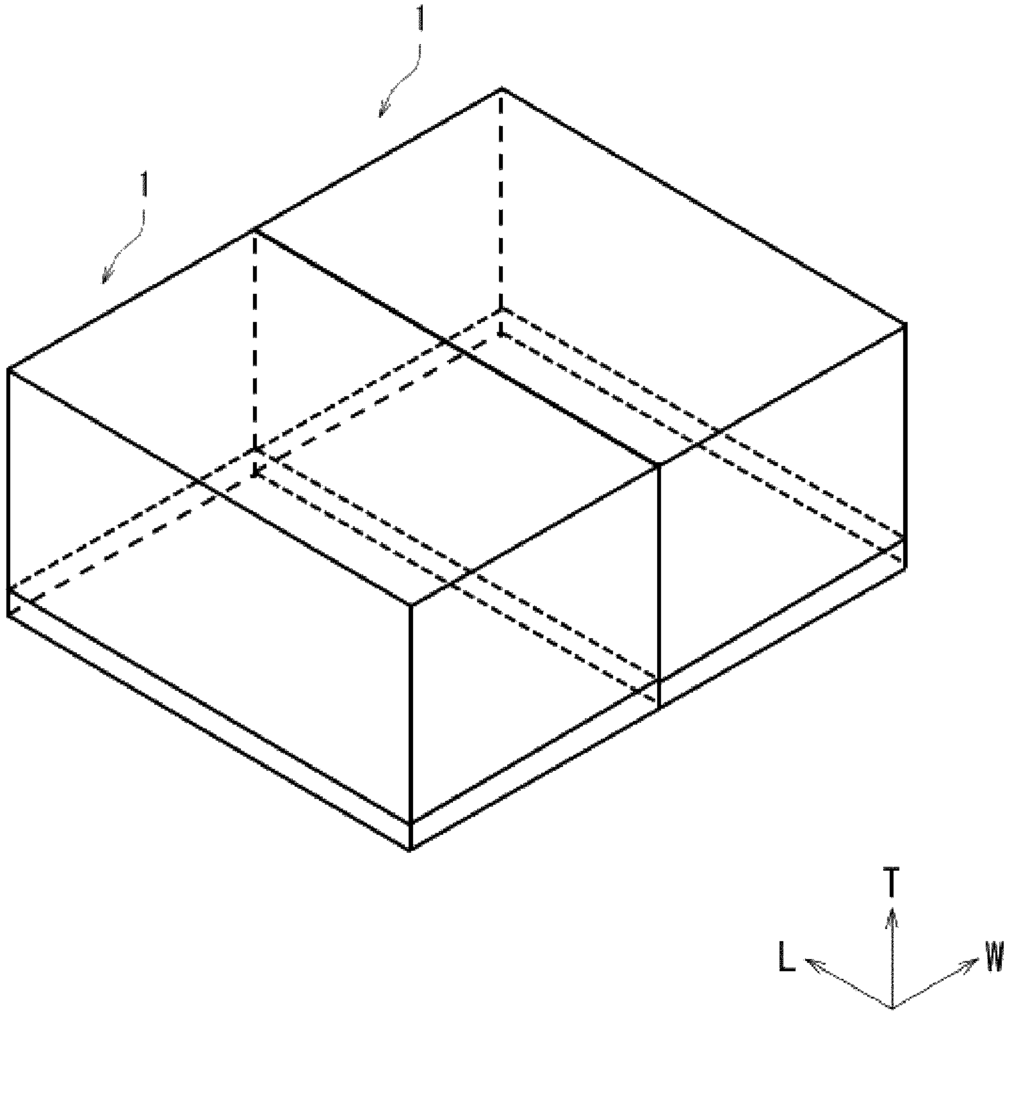
FIG. 13 is a schematic perspective view illustrating a coil array including a plurality of coil components, according to the fourth embodiment of the present disclosure.

As illustrated in FIG. 13, the coil array according to the fourth embodiment includes a plurality of coil components according to the present disclosure. Since the coil component according to the present disclosure has a high degree of setting flexibility with respect to the location of the outer electrode, even when the coil array includes a plurality of coil components, the outer electrode can be suppressed from affecting an adjacent coil component.

There is no particular limitation regarding the number of the coil components included in the coil array according to the present disclosure, and the number may be preferably 2 to 20 and more preferably 4 to 12.

The coil array according to the present disclosure can be produced by performing cutting on an array including a plurality of coil components basis rather than performing cutting into individual pieces during the cutting step in the above-described method for manufacturing the multilayer coil component 1.

EXAMPLES

Following the method for manufacturing the coil component 1 according to the first embodiment, a coil component having the size described below was produced, where an Fe—Si alloy particle having D50 of 10 μm serving as the metal magnetic particle, Fe—Zn—Cu ferrite serving as the nonmagnetic ferrite material, and a silver powder serving as the conductor powder were used, and the direct-current resistance (Rdc) was measured. Regarding the size of the coil component, the length was set to be 1.2 mm, the width was set to be 0.6 mm, and the height was set to be 0.6 mm.

TABLE 1

| | Width of coil conductor | Width of connection conductor | Direct-current resistance (Rdc) |
|---|---|---|---|
| Example 1 | 100 μm | 200 μm | 7.9 mΩinv |
| Example 2 | 100 μm | 400 μm | 7.1 mΩ |
| Comparative example 1 | 100 μm | 100 μm | 9.2 mΩ |

From the above-described results, it was ascertained that Rdc of Example 1 or Example 2 in which width of connection conductor/coil conductor is 2 to 4 is smaller than Rdc of Comparative example 1 in which width of connection conductor/coil conductor is 1.

The multilayer coil component according to the present disclosure may be widely used for various applications such as an inductor.

What is claimed is:

1. A coil component comprising:
an element assembly containing a magnetic material;
a coil conductor in the element assembly;
a connection conductor in the element assembly;
an extended conductor coupling the coil conductor to the connection conductor;
an outer electrode on a bottom surface of the element assembly; and
an insulating layer disposed on the bottom surface of the element assembly and having a cavity, the outer electrode being disposed in the cavity,
wherein
the coil conductor is electrically coupled to the outer electrode with the connection conductor and the extended conductor interposed therebetween,
the connection conductor extends from a junction portion connected to the extended conductor in a first direction, and
a width of the connection conductor is larger than a width of the coil conductor when viewed in the first direction.

2. The coil component according to claim 1, wherein
the coil component has a substantially rectangular parallelepiped shape where a height direction is an axial direction of the coil conductor, a length direction is a long-side direction of a bottom surface, and a width direction is a short-side direction of the bottom surface, and
the first direction is the width direction.

3. The coil component according to claim 2, wherein
the width of the connection conductor is from twice to 4 times the width of the coil conductor.

4. The coil component according to claim 2, wherein
a second extended conductor is disposed between the connection conductor and the outer electrode.

5. The coil component according to claim 2, wherein
the outer electrode is a plating layer.

6. The coil component according to claim 2, wherein
the outer electrode is an underlying electrode and a plating layer disposed on the underlying electrode.

7. A coil array comprising a plurality of coil components according to claim 2.

8. The coil component according to claim 1, wherein
the width of the connection conductor is from twice to 4 times the width of the coil conductor.

9. The coil component according to claim 8, wherein
a second extended conductor is disposed between the connection conductor and the outer electrode.

10. The coil component according to claim 8, wherein
the outer electrode is a plating layer.

11. The coil component according to claim 8, wherein
the outer electrode is an underlying electrode and a plating layer disposed on the underlying electrode.

12. A coil array comprising a plurality of coil components according to claim 8.

13. The coil component according to claim 1, wherein
a second extended conductor is disposed between the connection conductor and the outer electrode.

14. The coil component according to claim 13, wherein
the outer electrode is a plating layer.

15. The coil component according to claim 13, wherein the outer electrode is an underlying electrode and a plating layer disposed on the underlying electrode.

16. The coil component according to claim 1, wherein the outer electrode is a plating layer.

17. The coil component according to claim 16, wherein the plating layer is a Cu layer, a Ni—Sn layer, a Ni—Au layer, a Ni—Cu layer, or a Cu—Ni—Au layer.

18. The coil component according to claim 1, wherein the outer electrode is an underlying electrode and a plating layer disposed on the underlying electrode.

19. The coil component according to claim 18, wherein the plating layer is a Cu layer, a Ni—Sn layer, a Ni—Au layer, a Ni—Cu layer, or a Cu—Ni—Au layer.

20. A coil array comprising a plurality of coil components according to claim 1.

* * * * *